Patented Apr. 18, 1933

1,904,218

UNITED STATES PATENT OFFICE

JAMES A. FRANCEWAY, OF BATON ROUGE, LOUISIANA, ASSIGNOR TO STANDARD OIL DEVELOPMENT COMPANY, A CORPORATION OF DELAWARE

PROCESS FOR RESTORING THE ACTIVITY OF HYDROGENATION CATALYSTS

No Drawing.    Application filed June 23, 1930. Serial No. 463,348.

The present invention relates to an improved method for reactivating catalysts used in the hydrogenation of carbonaceous materials. My invention will be fully understood from the following description which sets forth preferred methods for carrying out my purpose.

In the catalytic hydrogenation of carbonaceous materials, such as coal, tar oils, petroleum oils and their fractions, it has been found that the activity of the catalyst decreases slowly over long periods of time. Such loss of activity is not caused by catalyst poisons such as sulfur, arsenic, and the like, but appears to be caused by a gradual accumulation of tarry hydrocarbons, and in some cases small particles of carbon, upon the surface of the catalyst, or by a change in the character of the surface of the catalyst. It is difficult to ascribe this change in surface character to any one factor, but it is believed that it may be caused by a change in the crystal structure, by sintering of the surface, or by molecular or sub-molecular rearrangement, or other surface phenomena.

Various methods have been proposed to remove the adhering materials which tend to cover the surface of the catalyst, for example solvents, such as benzol or naphtha, and gases which react with the adhering materials, such as steam, carbon dioxide, or oxygen, have been disclosed. None of these methods, however, are appreciably effective in restoring the activity of the catalyst when a change has occurred in the character of the surface. I have now found that the desired surface may be restored to the catalyst by treatment with materials which tend to etch, dissolve, or otherwise alter the surface of the catalyst, as will be disclosed in following paragraphs.

The catalysts used in the hydrogenation of carbonaceous materials comprise the oxides and/or sulfides of non-noble metals such as chromium, tungsten, molybdenum, or other members of the sixth group of the periodic system, either alone or in mixture with each other, or with other materials such as the oxides or sulfides of alkali metals, alkaline earths, rare earth metals, zinc oxide, alumina and the like. These catalysts are not poisoned by the sulfur compounds in petroleum oils and are suitably classified as sulfactive catalysts. These materials may be packed into the hydrogenation retort in the form of lumps, may be supported upon trays or upon other surfaces or carriers. When coal or other solid carbonaceous material is hydrogenated, it is generally supplied to the retort as a suspension in a liquid medium such as tar oil, and it is preferable to employ the catalyst in lump form or fixed upon surfaces within the retort, as is also the case when vapor phase operation is carried out. When hydrocarbons are hydrogenated in the liquid phase, the catalyst may be in lump form or may be finely divided and suspended in the liquid.

The hydrogenation may be carried out in any suitable manner, in batch or continuously, and is preferably conducted in a suitable high pressure retort with a gas rich in free hydrogen and in the presence of a catalyst as above specified. The temperature in the retort is generally between about 650 and 1000° F., although it may be higher or lower, if desired. Pressure is in excess of 20 atmospheres, and preferably in the neighborhood of 100 or 200 atmospheres, although 1000 atmospheres or more may be employed. Hydrogen, or a gas rich in hydrogen, is preferably forced through the retort continuously.

Loss of catalyst activity generally does not make itself manifest for a month or longer and then shows slight decreases, as indicated by the quality of the products. In the operation of my method where the catalyst activity has decreased to a predetermined value, it is first necessary to separate the catalyst from the oil, or coal and oil suspension. With the finely divided catalyst this may be carried out by filtration, settling or centrifugal means, but with a packed catalyst, the fluid may merely be withdrawn from the retort, leaving the catalyst in place where it may be subjected to treatment by my process, if desired. The catalyst is then treated to remove as much of the adhering hydrocarbon material as possible. This may be effected by means of solvents, such as benzol or naphtha, and/or by means of steam distillation at low pressures.

The remaining material adhering to the surface of the catalyst may be removed by treatment with oxygen-containing gases, as disclosed in my co-pending application, Ser. No. 463,347. In this application a reactivation method is disclosed whereby gases containing 2 to 21 percent of oxygen are passed over the catalyst at temperatures from 700 to 900° F. The oxygen may be diluted with nitrogen, carbon dioxide, steam, or mixtures of these. If desired, oxygen reactivation may be omitted and a process may be employed, whereby the catalyst is treated with gases such as steam or carbon dioxide at temperatures between 850 and 1300° F.

I have found that if the catalyst is subjected to the action of ammonia it may be restored to its original activity to a much greater degree than by the above mentioned methods alone. Other materials such as sodium or potassium hydroxide may also be employed, but I ordinarily prefer to use ammonia or ammonium hydroxide. It is generally desirable to employ the treatments described in previous paragraphs before subjecting the catalyst to ammonia or the like in order to free the catalytic surface of adhering hydrocarbon and carbonaceous material. However, the catalyst may be subjected to these agents after having been cleaned only by solvent extraction and/or steam distillation, especially where the catalytic surface shows no excessive accumulation of oily or tarry materials. As mentioned above, my process is especially effective in restoring catalysts in which the surface character has been altered, although the materials which I employ may aid to some extent in freeing and removing materials adhering to the catalytic surface.

My reactivation treatment may be carried out in a variety of ways. For example, the catalyst may be covered with water containing about 0.5 to 3 percent ammonia, or sodium or potassium hydroxide, and allowed to stand under pressures of about 20 to 100 atmospheres, for a period of 15 minutes to 2 hours. The time of the treatment and the concentration of the reagents are interdependent, higher concentration requiring a shorter time, as will be understood. My process may also be carried out by passing steam and ammonia gas through the catalyst in proportions equivalent to those mentioned above. In this case, however, sufficient temperature is preferably maintained to retain the steam in the vapor phase at the pressures employed. A similar operation may be employed where steam is passed over the catalyst and allowed to condense on the surface, ammonia gas is passed through with the steam, or afterwards, in order to dissolve in the condensed steam, thereby contacting with the surface of the catalyst as desired.

After it has been subjected to the action of ammonia, various methods may be used to free the catalyst of the ammonia and moisture. For example, flue gas, free of suspended matter, or nitrogen, or air may be passed through the catalyst at a temperature of 250 to 400° F., at atmospheric or higher pressures, until the gas ceases to gather moisture by its passage through the catalyst. If potassium or sodium hydroxide is used it is desirable to wash the catalyst free of these materials before drying. Hydrogen may be used very advantageously in place of the gases mentioned and may preferably be employed at temperatures between about 250 and 900° F. and at atmospheric or at superatmospheric pressures. In many cases it is found that the hydrogen serves to place the catalyst in a condition of maximum activity after the preceding treatment.

My invention is not to be limited by any theory of the mechanism of the reactions nor to any specific example which may have been given for purpose of illustration, but only by the following claims in which I wish to claim all novelty inherent in my invention.

I claim:

1. An improved process for reactivation of sulfactive catalysts used in the hydrogenation of carbonaceous material with free hydrogen at a pressure in excess of 20 atmospheres which comprises removing the bulk of the carbonaceous material from the said sulfactive catalyst and etching the surface of the catalyst.

2. Process according to claim 1 in which the etching agent comprises a dilute solution of ammonia.

3. Process according to claim 1 in which the etching agent comprises a mixture of steam and ammonia.

4. Process according to claim 1 in which the carbonaceous material consists of hydrocarbon oil.

5. Process according to claim 1 in which the reactivation is carried out under a pressure in excess of atmospheric.

6. An improved process for reactivation of sulfactive solid catalytic material used in the hydrogenation of carbonaceous material with free hydrogen at a pressure in excess of 100 atmospheres which comprises removing the bulk of the carbonaceous material from the said sulfactive catalyst and subsequently etching the surface of the catalyst.

7. An improved process for reactivation of sulfactive catalysts used in the hydrogenation of petroleum oils with free hydrogen at a pressure in excess of 20 atmospheres which comprises removing the bulk of the oil from the said sulfactive catalyst by solvent extraction and etching the surface of the catalyst.

8. An improved process for reactivation of sulfactive catalysts used in the hydrogenation of carbonaceous materials with free hydrogen at a pressure in excess of 100 atmospheres which comprises removing the bulk of the carbonaceous material from the said sulfactive catalyst by solvent extraction and oxidation with an oxygen-containing gas, and etching the surface of the catalyst with a dilute solution of ammonia.

9. Process according to claim 8 in which the ammonia solution contains 0.5 to 3.0 percent ammonia and the time of etching is 15 minutes to 2 hours.

10. An improved process for reactivation of sulfactive catalysts used in the destructive hydrogenation of carbonaceous material which comprises removing the bulk of the carbonaceous material from said sulfactive catalyst and then etching the surface of the catalyst with a suitable solvent for a constituent thereof.

11. An improved process for reactivation of sulfactive catalysts containing a compound of a metal of Group VI of the periodic system selected from the group consisting of oxides and sulfides of chromium, tungsten and molybdenum and used in the hydrogenation of carbonaceous material with free hydrogen at a pressure in excess of 20 atmospheres, which comprises removing the bulk of the carbonaceous material from said catalyst and then etching the surface of the catalyst with a suitable solvent for said compound.

12. An improved process for reactivation of sulfactive catalysts containing a compound of a metal of Group VI of the periodic system selected from the group consisting of oxides and sulfides of chromium, tungsten and molybdenum and used in the hydrogenation of carbonaceous material with free hydrogen at a pressure in excess of 20 atmospheres, which comprises removing the bulk of the carbonaceous material from said catalyst and then treating the catalyst with a suitable solvent for said compound under such conditions that said compound is partially, but not completely, dissolved.

13. An improved process for reactivation of sulfactive catalysts containing a compound of molybdenum selected from the group consisting of oxides and sulfides and used for the hydrogenation of carbonaceous material with free hydrogen at a pressure in excess of 20 atmospheres, which comprises removing the bulk of the carbonaceous material from the said catalyst and then etching the surface of the catalyst with ammonia.

14. Process according to claim 13 in which the etching agent comprises a dilute aqueous solution of ammonia.

15. Process according to claim 13 in which the etching agent comprises an aqueous solution containing 0.5 to 3.0% ammonia and the time of etching is from 15 minutes to 2 hours.

16. An improved process for reactivation of sulfactive catalysts containing a compound of a metal of Group VI of the periodic system selected from the group consisting of oxides and sulfides of chromium, tungsten and molybdenum and used in the hydrogenation of carbonaceous material with free hydrogen at a pressure in excess of 20 atmospheres, which comprises removing the bulk of the carbonaceous material from said catalyst and then etching the surface of said catalyst with a mixture of steam and ammonia.

17. An improved process for reactivation of sulfactive catalysts containing a compound of a metal of Group VI of the periodic system selected from the group consisting of oxides and sulfides of chromium, tungsten and molybdenum and used in the hydrogenation of carbonaceous material with free hydrogen at a pressure in excess of 20 atmospheres, which comprises removing the bulk of the carbonaceous material from said catalyst and then etching the surface of the catalyst at a pressure in excess of atmospheric with a suitable solvent for said compound.

JAMES A. FRANCEWAY.